Figure 4:
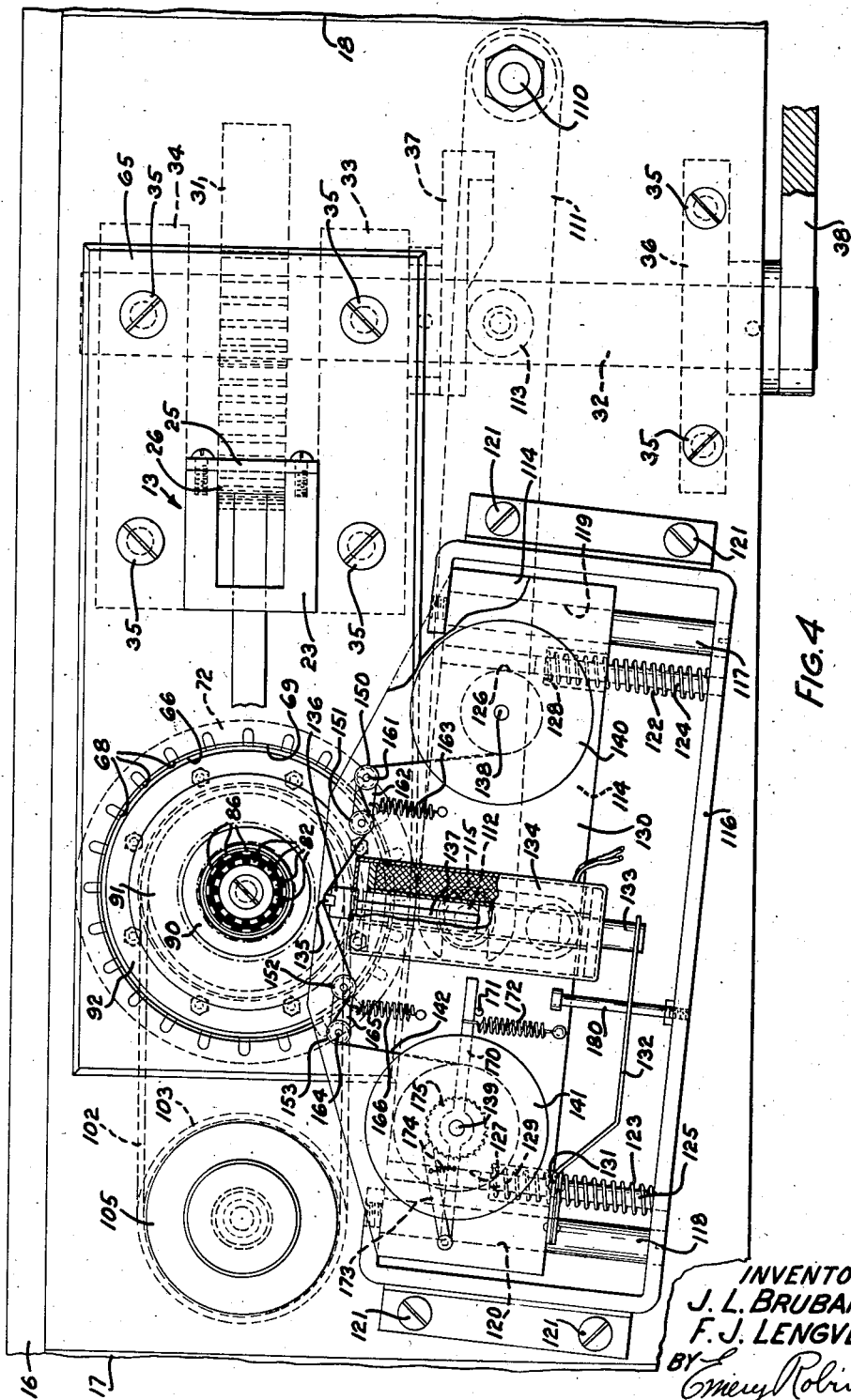

March 9, 1943.  J. L. BRUBAKER ET AL  2,313,516
TESTING APPARATUS
Filed July 27, 1940  3 Sheets-Sheet 1
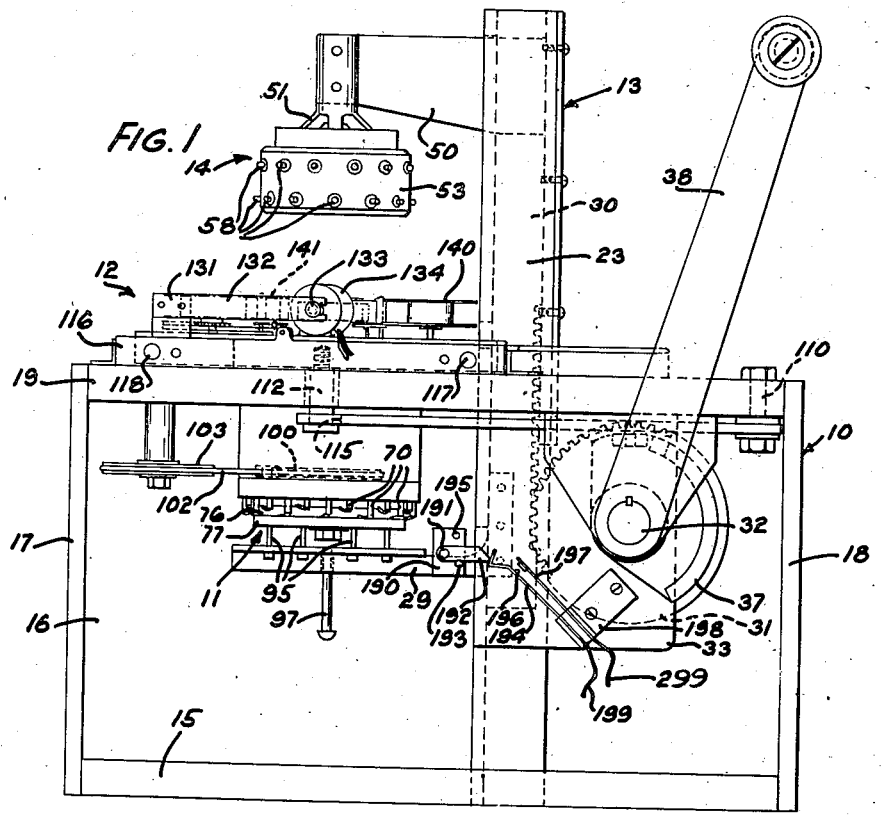
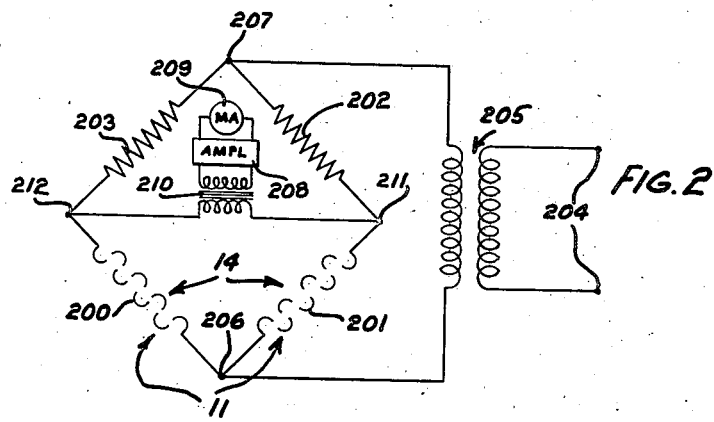
INVENTORS
J. L. BRUBAKER
F. J. LENGVENIS
BY Emery Robinson
ATTORNEY

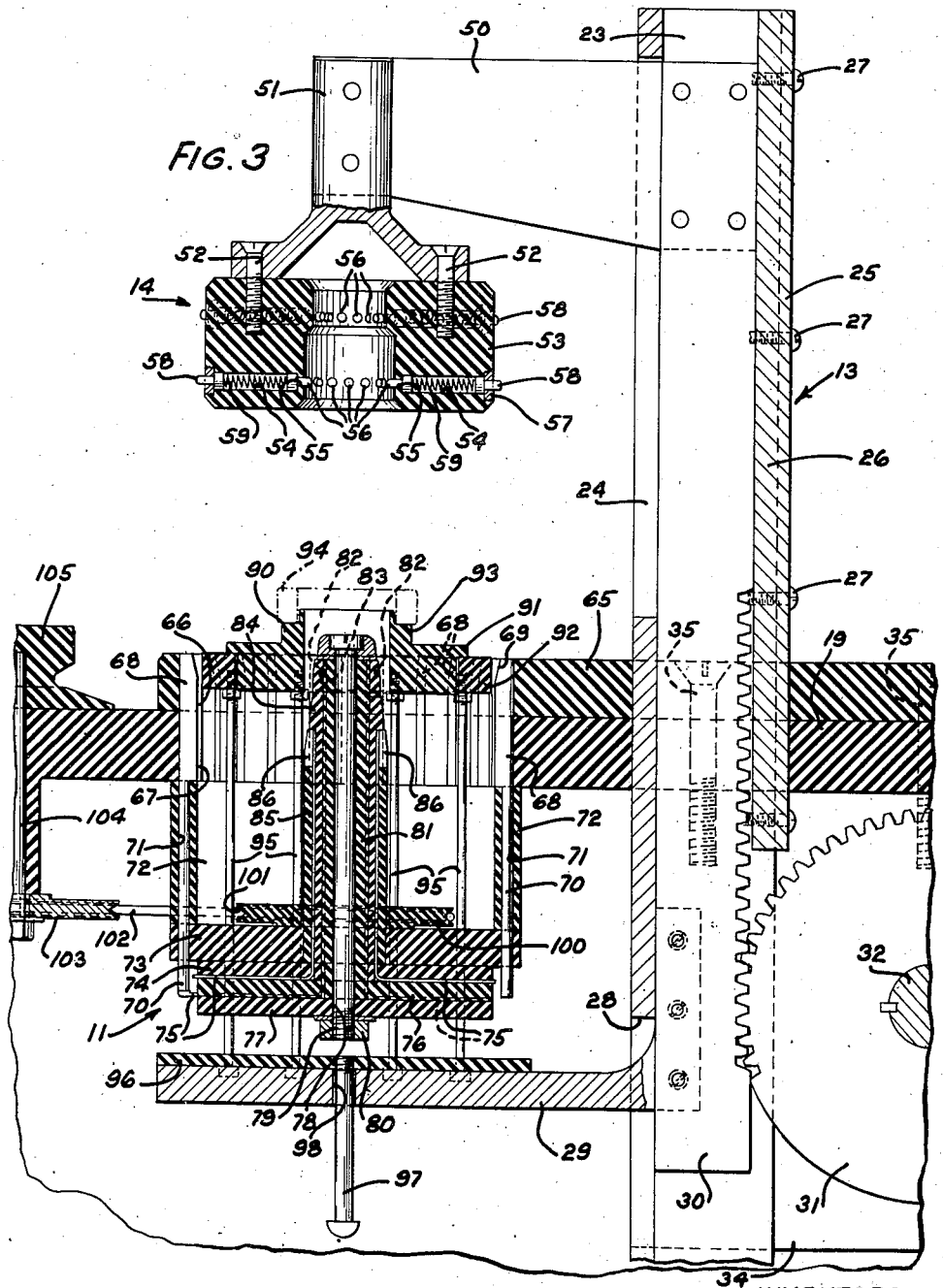

Patented Mar. 9, 1943

2,313,516

UNITED STATES PATENT OFFICE 2,313,516

TESTING APPARATUS

Jasper L. Brubaker, Oak Park, and Frank J. Lengvenis, Chicago, Ill., assignors to Western Electric Company, Incorporated, New York, N. Y., a corporation of New York Application July 27, 1940, Serial No. 347,926

8 Claims. (Cl. 175—183)

This invention relates to testing apparatus and more particularly to apparatus for indicating what two equal portions of a toroidal core have equal magnetic reluctance.

In the manufacture of molybdenum "Permalloy" dust cores, which are toroidal in shape and which are adapted particularly for use in loading coils of telephone systems, it is extremely difficult to distribute the magnetic material in the core so as to obtain a core ring of uniform magnetic properties. For this reason, two equal windings, wound symmetrically on opposite portions of a core selected at random, will not ordinarily have equal inductance and must be balanced by adding or removing turns to equalize, insofar as possible, the inductance of the windings.

It is an object of the present invention to provide apparatus for determining and indicating a characteristic of a core.

A further object is to provide apparatus for determining and indicating which two equal portions of a ring-shaped core have substantially equal magnetic reluctance.

In accordance with one embodiment of the invention, semi-circular split coils are provided within which a core ring may be positioned and mechanism is provided for rotating the core within the coils, while measuring diametrically opposed halves of the core, to bring the core to a position where the split coil's windings are influenced substantially equally by the core. An inductance unbalance bridge, including the split coils, is utilized to determine the halves of the core which have substantially equal reluctance and means is provided for automatically marking the outside of the core with a mark to indicate a substantially neutral axis of the core. The mechanism for marking the core is automatically controlled upon the opening of the split coils to permit removal of the core from the apparatus.

A better understanding of the invention may be had by reference to the following detailed description when considered in conjunction with the accompanying drawings, wherein Fig. 1 is a side elevational view of apparatus embodying the invention, the side plate of the box which encloses part of a mechanism being removed to more clearly show the construction of the apparatus within the box;

Fig. 2 is a circuit diagram showing a suitable type inductance unbalance bridge for measuring the halves of the core to determine the point where the split coils are substantially balanced inductively;

Fig. 3 is a vertical sectional view taken through the apparatus shown in Fig. 1 and showing the details of the split coil and means for positioning the core within the coil; and Fig. 4 is an enlarged plan view of the apparatus, parts being broken away to more clearly show the parts beneath them and showing the details of mechanism for automatically marking the neutral axis of the core upon removal of the core from the split coil.

Referring to the drawings, wherein like reference characters designate the same parts throughout the several views, the apparatus comprises, as shown in Fig. 1, a box-like structure 10 within which there is positioned one turn 11 of the split coil and on top of which there is mounted the mechanism 12 for marking the neutral axis of the coil, and extending upwardly from which there is a guide 13 which carries the other portion 14 of the split coil. The box-like structure 10 comprises a base member 15, an end member 16, and front and rear members 17 and 18, which support a top plate 19. Fixed to the base member 15 is the lower end of the guide 13 which extends upwardly from the base member and through the top plate 19. The guide 13 comprises a channel member 23 having a slot 24 formed in its web and having mounted on the ends of its flanges a guide plate 25, which has a portion 26 extending into the channel of the channel member 23 and which is fixed to the flanges of the member 23 by screws 27—27. The lower end of the web of the channel member 23 has a slot 28 formed in it through which extends an actuating arm 29 fixed to a rack 30. The guide plate 25 does not extend throughout the end of the channel member 23, but terminates just below the top plate 19 to permit a gear segment 31 to engage its teeth with the teeth of the rack 30. The gear segment 31 is keyed to a shaft 32, which is, in turn, journalled in bearing blocks 33, 34 and 36 secured to the underside of the plate 19 by means of screws 35—35. The shaft 32 carries, in addition to the gear segment 31, a cam 37 and an actuating handle 38, which are fixed to the shaft 32.

Mounted on the rack 30, at its upper end, is an arm 50, which supports the portion 14 of the split coil. A spider 51, fixed to the end of the arm 50, has screwed thereto, by means of screws 52—52, a ring 53 of insulating material. The ring 53 of insulating material has a plurality of pockets 54 of relatively large diameter formed in it, which communicate with apertures 55 of somewhat smaller diameter at the inner wall of the ring. Each of the pockets 54 has a shouldered member 56 positioned in it with its shoulder engaging the shoulder formed by the junction of the pocket 54 and the aperture 55 and with its reduced portion extending through the aperture 55. The end of each of the pockets 54 adjacent the periphery of the ring 53 has a retaining ring 57 set into it, in which there is positioned a shoulder member 58 of exactly the same construction as the shouldered member 56 and there is positioned in each of the pockets 54 a compression spring 59, which bears against the shouldered members 56 and 58 and urges them inwardly and outwardly, respectively, so that the reduced portions of the shouldered members extend beyond the inner surface and outer surface of the ring 53 and are electrically interconnected by means of the springs 59.

The top plate 19, which is made of insulating material, has superposed on it a rectangular block 65 of insulating material in which there is formed a circular aperture 66, which communicates with a similar aperture 67 in the top plate 19. Set into the edges of the apertures 66 and 67 are a plurality of contactors 68, which, together with the upper edge of the aperture 66, are tapered, as shown at 69. Each of these contactors 68 has extending downwardly from it and formed integrally with it, a rod 70 of conducting material which extend through holes 71 formed in a tubular member 72 made of insulating material and having an inside diameter equal to the diameter of the apertures 66 and 67. Fixed to the bottom of the tubular member 72 (Fig. 3) is a disc 73, also made of insulating material and having attached to its lower edge a disc 74 of somewhat smaller diameter. The disc 74 is grooved to receive connecting wires 75—75 and has fixed to its lower faces a disc 76 of somewhat similar construction, which is also grooved to receive wires 75 and a third disc 77 of the same diameter as the discs 74 and 76 is fixed to the underside of the disc 76. An aperture 78 is formed centrally of the disc 77 and has extending through it a bolt 79, on which there is threaded a nut 80 for holding a sleeve 81 in position on the disc 77. The sleeve 81 has a series of grooves formed in its periphery to receive upwardly extending portions of the wires 75, which have connected at their upper ends contact members 82, which are, in turn, seated in slots 83 formed in the upper end of a sleeve 84 of insulating material, which surrounds the sleeve 81. The sleeve 84 is somewhat similar to the sleeve 81 in that it has grooves in its periphery for receiving upwardly extending portions of others of the wires 75 and in that it is encircled by still a third sleeve 85, which is notched out at its upper end to receive contacts 86 fixed to the upper ends of the shorter wires 75. There is thus provided a rigid stem or centerpiece having contacts 86 and 82 positioned about its periphery at two different levels and connected to wires 75, which, through the rods 70, are connected to contacts 68.

From the foregoing, it is believed to be apparent that when the portion 14 of the split coil is moved downwardly to a position where the shouldered member 58 will engage the contacts 66 and the shouldered members 56 will engage with the contacts 86 or 82, two continuous coils will be formed, as illustrated in Fig. 2, by joining the portions 14 and portions 11 of the coils.

Encircling the stem or centerpiece in which the contacts 82 and 86 are mounted is an irregular shaped ring 90 of insulating material, which has a shoulder 91 extending outwardly over a ring 92, and which has a smaller shouldered portion 93 on which a loading coil core 94 may be positioned to hold the core while it is being tested to determine which two equal portions of it have equal magnetic quality. The ring 92 is fixed to the ends of a series of rods 95, which, at their lower ends, are secured to a disc 96 of insulating material. Threaded into the disc 96 is a shouldered pin 97, which extends through an aperture 98 in the actuating arm 29. The size of the ring 92 is such that it normally bears lightly against the inner wall of the aperture 66 and tubular member 72 so that when the actuating arm 29 starts to move downwardly, the ring 92 will not immediately move with it, but after the actuating arm 29 moves down far enough for the edges of the aperture 98 to engage the shoulder on the pin 97, the ring 92 will be drawn downwardly with the actuating arm 29 and since the irregularly shaped ring 90 rests on the ring 92, it will also move downwardly. Positioned within the tubular member 72, and rotatable about the sleeve 85, is a turn table 100 having a suitable abrasive on the upper face thereof. The turn table 100 is slightly less in diameter than the inside diameter of the ring 92 and when the ring 92 carries the ring 90 downwardly to the point where the ring 90 will rest on the turn table 100, the turn table 100 will rotate the ring 90 with the core 94 on it. The turn table 100 has a groove 101 formed in its periphery for receiving a belt 102, which extends through holes in the tubular member 72 and is positioned about a sheave 103. The sheave 103 is fixed to a shaft 104, which extends through the top plate 19 and has a dial or hand wheel 105 fixed to it, whereby rotation may be imparted to the turn table 100 upon rotation of the dial 105 to rotate the core 94 within the split coil formed of portions 11 and 14.

Pivotally mounted on a pin 110, which is secured to the top plate 19, is a lever 111, which carries at its free end an actuating pin 112, and which carries intermediate its ends a cam roller 113. The cam roller 113 is positioned in the path of the cam 37 and when the shaft 32 is rotated, the cam 37 will, through the cam roller 113, move the lever 111 downwardly, as viewed in Fig. 4, thereby to rock the lever 111 in a counter-clockwise direction about the pin 110. The actuating pin 112 is secured to a slidable block 114 and is slidable itself in a slot 115 in the lever 111 so that when the lever 111 is rocked in a counter-clockwise direction about the pin 110, the block 114 will be moved downwardly (Fig. 4). The block 114 is slidable within a framework 116 in which it is slidably mounted on a pair of guide members 117 and 118. The guide members 117 and 118 are suitably fixed in the framework 116 and extend through holes 119 and 120, respectively, formed in the block 114. The framework 116 is mounted, by means of screws 121—121, on the upper surface of the top plate 19 and the block 114 is urged toward the upper (Fig. 4) open end of the framework 116 by a pair of compression springs 122 and 123, which surround pins 124 and 125, respectively, engaged in shouldered apertures 126 and 127 in the block 114, the springs 122 and 123 engaging the shoulders 128 and 129, respectively, of the apertures 126 and 127. Mounted on the upper surface of the block 114 is a plate 130 having an upwardly extending portion 131, to which there is fixed a leaf spring 132 for normally holding a plunger 133 of a solenoid 134 in the position shown in Fig. 4. The solenoid 134 is mounted on the plate 130 and upon energization will draw the plunger 133 upwardly (Fig. 4) to actuate a relatively soft marking element 135, which is mounted on an enlarged portion 136 of the stem 137 of the plunger 133. Also mounted on the plate 130 are a pair of spool supporting pins 138 and 139, on which there are rotatably mounted supply and takeup spools 140 and 141, respectively, for a typewriter ribbon 142. The supply spool 140 engages its pin 138 frictionally and the ribbon 142 is directed from the spool 140 over a guide roller 150, under a guide roller 151, across the end of the marking element 135, under a guide roller 152, over a guide roller 153, to the takeup spool 141. A pin 151 rotatably supports the guide roller 150 on the plate 130 and also supports a lever 162, which is urged to rock about the pin 151 in a counter-clockwise direction by a coil spring 163, and which carries on its free end the guide roller 151. In a similar manner, a pin 164 which rotatably supports the guide roller 153, also rotatably supports a lever 165, which is urged to rock about the pin 164 by a spring 166 and which carries at its free end the guide roller 152. In this manner, the ribbon extending between the supply and takeup spools 140 and 141 is held by spring tension against the marking element 135, but may be moved upwardly (Fig. 4) upon energization of the solenoid 134.

Oscillatable about the pin 139 is a pawl supporting lever 170, which is normally urged downwardly (Fig. 4) into engagement with a pin 171 by a coiled spring 172. The lever 170 carries, at its free end, a pawl 173, which is urged downwardly (Fig. 4) by a spring 174 interconnecting the pawl 173 and the lever 170. The pawl 173 registers with the teeth of a ratchet 175, which is fixed to the takeup spool 141 and which will be actuated by the pawl when the spring 172 moves the lever 170 into engagement with the pin 171. The lever 170 is actuated each time the actuating handle 38 is operated through one complete cycle due to the fact that the cam 37 will rock the lever 111 in a counter-clockwise direction to thereby move the block 114 and plate 130 downwardly (Fig. 4) to carry the lever 170 against an abutment 180 fixed to the framework 116. After the lever 38 is returned to its normal position, as shown in Fig. 4, the blocks 114 and plate 130, in moving upwardly, will disengage the lever 170 from the abutment 180 and the spring 172 will, thereby, cause the pawl 173 to step the takeup spool 141 a short distance to carry a new supply of typewriter ribbon into engagement with the marking element 135.

Fixed to the actuating arm 29 is a block 190 having a pin 191 extending therefrom on which there is pivoted a trip pawl 192. The trip pawl, in its normal position, as shown in Fig. 1, rests on a pin 193 and when the actuating arm 29 is moved downwardly, the pawl 192 will engage a bent-over portion of a contact member 194 and will rock about the pin 191. A pin 195 is provided to prevent the pawl 192 from moving in a counter-clockwise direction about its pivot pin 191 beyond a predetermined distance. When the actuating arm 29 is moved upwardly, the pawl 192 resting on the pin 193 will engage the bent-over portion of the contact member 194 and move a contact 196 mounted on the contact member 194 into engagement with a contact spring 197. When the contact 196 engages the contact spring 197, both of which are insulatedly mounted on a bracket 198, a circuit will be completed between the leads 199 and 299 connected to the contact members 194 and 197, respectively, to energize the solenoid 134.

The coil formed by the portions 11 and 14 of the split coil is interrupted so that there is, in effect, provided two separate coils, which, in Fig. 2, have been designated 200 and 201. The coil 200 includes those parts of the portions 11 and 14 which lie on one-half of the semi-circle and the coil 201 includes those parts of the portions 11 and 14 which lie on the other half of the semi-circle. The coils 200 and 201 thus formed are, as shown in Fig. 2, connected in a bridge circuit, which includes the coil 200 in one arm, the coil 201 in the second arm, resistance 202 in a third arm, and a resistance 203 of equal value in the fourth arm. A source of current 204 is connected through a transformer 205 to the points 206 and 207 of the bridge circuit thus formed and an amplifier 208, whose output is connected to a milliammeter 209, is connected through a suitable transformer 210 to the points 211 and 212 of the bridge circuit. It is believed to be apparent that when a core is placed in the apparatus described hereinbefore and the portions 11 and 14 of the split coils interconnected, the core will change the relative impedance of the bridge circuit shown in Fig. 2 and the milliammeter will be deflected from its normal position an amount dependent upon the variation between the two halves of the core at that time associated with the coils 200 and 201.

A better understanding of the invention will be had by the following brief description of the mode of operation thereof. The core to be tested may be placed on the shoulder 93 and the handle 38 may then be moved from the position shown in a counterclockwise direction. As the handle 38 is moved in a counterclockwise direction, the actuating arm 29 will be moved downwardly through the action of the gear segment 31 and rack 30. As the actuating arm 29 moves downwardly, the cam 37 will engage the cam roller 113 and cam it downwardly, as viewed in Fig. 4, thereby to move the block 114 and plate 130 downwardly and carry the marking element 135 out of the path of the portion 14 of the split coil. As soon as the cam 37 has thus moved the block 114 and apparatus carried thereby out of the path of the portion 14 of the split coil, the arm 29 will engage the shoulder on the pin 97 and move the disc 96 and ring 92 downwardly to and carry the ring 90 down onto the turn table 100. As the rack 30 moves downwardly, the spring-pressed shouldered members 58 will engage with their respective contactors 68 and the spring-pressed shouldered members 56 will engage with their respective contact members 82 and 86 to complete the coils 200 and 201 surrounding the core 94. After the core 94 has thus been carried down into position within the coils 200 and 201, it may be rotated by rotating the dial or hand wheel 105 until a balance or approximately balanced condition is indicated by the milliammeter 209. When this condition is indicated by the milliammeter 209, the handle 38 may be returned to its normal position. As the handle 38 returns to its normal position, the portion 14 of the split coil will be moved upwardly through the action of the rack and pinion 30 and 31 and the actuating arm 29 will move upwardly along the shouldered pin 97 until the actuating arm 29 engages the disc 96 without moving the core 94 from the testing position. As soon as the actuating arm 29 engages the disc 96, it will move the disc 96 upwardly to carry the ring 92 with it and shortly after the ring 92 moves out of its lowermost position, it will engage the shoulder 91 on the ring 90 to carry the core up and into the position shown in Fig. 3. As the core moves into the position shown in Fig. 3, the cam 37 will have its low portion moved into association with the cam roller 113 and the springs 122 and 123 will be permitted to move the block 114 to the position shown in Fig. 4. As soon as the block 114 arrives in the position shown in Fig. 4, the trip pawl 192 will engage the contact member 194 to complete a circuit to the solenoid 134, thereby to energize the solenoid and cause the marking element 135 to drive the typewriter ribbon 142 against the periphery of the core. As soon as the coils 200 and 201 are split along a line adjacent the marking element 135, the mark impressed on the core by the marking element 135 will indicate the point at which separators should be put on the core to divide the core in two equal halves, so that when coils are wound on the core, equal windings on each half of the core will cause the coils to have substantially equal inductance when connected in a telephone circuit.

Although a specific embodiment of the invention has been described hereinbefore, it will be understood that adaptations and modifications may be made without departing from the scope of the invention, which is to be limited only by the appended claims.

What is claimed is:

1. In a testing apparatus, a pair of semi-circular coils each split into two portions, means for moving the split portions of said coils together to form a pair of coils, and means for rotating an article within the coils.

2. In a testing apparatus for annular cores, a pair of semi-circular coils, each of said coils being split into two portions, means for moving the split portions of said coils relative one to another to surround a core to be tested, and means for rotating the core while it is surrounded by said coils.

3. In a testing apparatus for annular cores, a pair of semi-circular coils, each of said coils being split into two portions, an arm for supporting a portion of both coils, means for moving said arm to move the portions of the coils carried thereby into electrical contact with the other portions of the coils to surround a core, means for supporting a core, and means interconnecting the core supporting means and said arm to carry the core into testing position upon actuation of said arm.

4. In a testing apparatus, a core receiving member, means for rotating the core receiving member, a pair of split coils, means for rigidly supporting a portion of each of said coils, movable supporting means for the other portions of said coils, and means for actuating the movable supporting means for the coils and for moving the core receiving member at an angle to its plane of rotation.

5. In a testing apparatus for cores, a core receiving member, a pair of split coils each having movable and fixed portions, means for moving said core receiving member into association with the fixed portion of the coils, and a common actuating means for actuating the said moving means and for moving the movable portions of the coils into operative engagement with the fixed portions thereof.

6. In a testing apparatus, a pair of split coils each having a fixed and a movable portion, means for rotatably supporting an article to be tested within said coils, means for moving the movable portions of the coils into operative association with the fixed portions thereof, means for moving the core to be tested into and out of operative association with the split coils, means for actuating the movable portions of the coils, and the core moving means, and means operable under control of said actuating means for marking the cores after they have been associated with the split coils.

7. In a testing apparatus for toroidal cores, means for rotating a core, means for measuring the relative reluctance of diametrically opposed halves of the core, means for moving the core into and out of operative association with the measuring means, and means operable under control of said last mentioned means for marking the core on a line between halves thereof which have substantially equal reluctance.

8. In a testing apparatus, a pair of coils, each of said coils being split into two portions, means for moving the split portions of said coils together to surround an article, and means for rotating the article while surrounded by the coils to present various areas of the article to various areas of the coils.

JASPER L. BRUBAKER.
FRANK J. LENGVENIS.